(12) United States Patent
Jolfaei

(10) Patent No.: US 9,191,389 B2
(45) Date of Patent: Nov. 17, 2015

(54) ACCESS CONTROL OF REMOTE COMMUNICATION INTERFACES BASED ON SYSTEM-SPECIFIC KEYS

(71) Applicant: Masoud Aghadavoodi Jolfaei, Wiesloch (DE)

(72) Inventor: Masoud Aghadavoodi Jolfaei, Wiesloch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/157,757

(22) Filed: Jan. 17, 2014

(65) Prior Publication Data

US 2014/0137213 A1     May 15, 2014

Related U.S. Application Data

(63) Continuation of application No. 13/353,558, filed on Jan. 19, 2012, now abandoned.

(51) Int. Cl.
| | |
|---|---|
| *G06F 7/00* | (2006.01) |
| *H04L 29/06* | (2006.01) |
| *G06F 21/33* | (2013.01) |

(52) U.S. Cl.
CPC .............. *H04L 63/10* (2013.01); *G06F 21/335* (2013.01); *H04L 63/0807* (2013.01)

(58) Field of Classification Search
USPC ............ 726/4, 5, 6, 8, 9, 10; 713/155; 80/203
See application file for complete search history.

(56) References Cited

U.S. PATENT DOCUMENTS

| | | | |
|---|---|---|---|
| 7,089,585 B1 * | 8/2006 | Dharmarajan | ..................... 726/8 |
| 2003/0135740 A1 * | 7/2003 | Talmor et al. | ................. 713/186 |
| 2008/0148183 A1 | 6/2008 | Danninger | |
| 2008/0301468 A1 | 12/2008 | Murase et al. | |
| 2009/0007250 A1 * | 1/2009 | Pouzin et al. | ................... 726/10 |
| 2010/0017859 A1 * | 1/2010 | Kelly et al. | ........................ 726/5 |
| 2010/0262650 A1 * | 10/2010 | Chauhan et al. | ............. 709/203 |
| 2011/0107409 A1 * | 5/2011 | Wilkinson et al. | ................. 726/8 |
| 2011/0145590 A1 | 6/2011 | Harada et al. | |
| 2011/0153853 A1 | 6/2011 | London et al. | |
| 2011/0154465 A1 | 6/2011 | Kuzin et al. | |
| 2011/0202989 A1 * | 8/2011 | Otranen et al. | .................... 726/8 |
| 2011/0214174 A1 * | 9/2011 | Herzog et al. | ................... 726/10 |

(Continued)

OTHER PUBLICATIONS

Non-Final Office Action for U.S. Appl. No. 13/353,558, mailed Apr. 2, 2013, 29 pages.

(Continued)

*Primary Examiner* — Joseph P Hirl
*Assistant Examiner* — Sayed Beheshti Shirazi
(74) *Attorney, Agent, or Firm* — Brake Hughes Bellermann LLP

(57) ABSTRACT

A computer implemented method, computer program product, and computer system is provided for receiving a service request to obtain service from a second application, the service request including a client context and a signed ticket obtained by the first application from a system computer, validating the received signed ticket based on the key associated with the system, determining that the first application has authorization to obtain the requested service via the remote interface of the second application based on a comparison of one or more attributes of the received client context to an access control list associated with the second application, and sending a service reply from the second application to the first application to provide the requested service to the first application in response to determining that the first application has authorization to obtain the requested service via the remote interface of the second application.

20 Claims, 3 Drawing Sheets

(56) References Cited

U.S. PATENT DOCUMENTS

| | | |
|---|---|---|
| 2012/0050455 A1 | 3/2012 | Santamaria et al. |
| 2012/0089980 A1 | 4/2012 | Sharp et al. |
| 2012/0102549 A1 | 4/2012 | Mazzaferri et al. |
| 2012/0159601 A1* | 6/2012 | Dalzell et al. .................... 726/9 |
| 2012/0226749 A1* | 9/2012 | Dale et al. ..................... 709/204 |
| 2012/0284507 A1* | 11/2012 | Bostanci et al. .............. 713/155 |
| 2012/0330875 A1* | 12/2012 | Angele ........................... 706/47 |
| 2013/0006878 A1* | 1/2013 | Brooks et al. ................. 705/318 |
| 2013/0191882 A1* | 7/2013 | Jolfaei .............................. 726/4 |

OTHER PUBLICATIONS

Non-Final Office Action Response for U.S. Appl. No. 13/353,558, filed Jul. 29, 2013, 16 pages.

Final Office Action for U.S. Appl. No. 13/353,558, mailed Oct. 17, 2013, 29 pages.

* cited by examiner

ACCESS CONTROL OF REMOTE COMMUNICATION INTERFACES BASED ON SYSTEM-SPECIFIC KEYS

PRIORITY CLAIM

This Application is a continuation of U.S. patent application Ser. No. 13/353,558, filed on Jan. 19, 2012, entitled, "Access Control Of Remote Communication Interfaces Based On System-Specific Keys," the disclosure of which is hereby incorporated by reference

TECHNICAL FIELD

This description is directed generally to access control, and in particular, to a computer-implemented method, apparatus, and computer program product for access control of remote communication interfaces based on system-specific keys.

BACKGROUND

Many services, such as some services accessible via Hyper-Text Transfer Protocol (HTTP), File Transfer Protocol (FTP) and other protocols, may be remotely accessed. In order to be remotely accessible, such services may be tagged as remote callable services. There exist different technologies, e.g. Remote Method Invocation (RMI), Common Object Request Broker Architecture (CORBA), Remote Function Call (RFC), to enable services, implemented in different languages, e.g. JAVA, C, C++, ABAP, etc., to be called remotely. One of the security issues which arises in some situations with remote services is that due to the remote accessibility, those services could be called from anywhere whenever network connectivity to the remote service can be established. This may present security risks where accessibility to some services should be restricted to certain programs or users.

In a system containing several services, e.g. payment, salary, order entry, shopping cart, product availability check, credit card authorization, etc., only some of the services may be accessible to any client (such as a shopping cart service), while other services (e.g., credit card authorization service, product or inventory check for a requested item, or other administrative services) should be accessible only to a subset of other programs or users.

SUMMARY

In one general aspect, a computer program product is provided. The computer program product is tangibly embodied on a computer-readable storage medium and includes executable code that, when executed, is configured to cause at least one data processing apparatus to receive, by a remote access engine running on the second application server from a first application running on a first application server, a service request to obtain service from a second application that includes a remote interface and is running on the second application server, the service request including a client context and a signed ticket obtained by the first application from a system computer, wherein the signed ticket is based on the client context and a key associated with a system; validate, by the remote access engine, the received signed ticket based on the key associated with the system, wherein a validated signed ticket from the first application indicates that the first application is authorized to receive service from the second application; determine, by the remote access engine, in response to the signed ticket being validated, that the first application has authorization to obtain the requested service via the remote interface of the second application based on a comparison of an attribute of the received client context to an access control list associated with the second application; and send a service reply from the second application to the first application to provide the requested service to the first application in response to determining that the first application has authorization to obtain the requested service via the remote interface of the second application.

In another general aspect, a computer implemented method is provided that includes receiving, by a remote access engine running on the second application server from a first application running on a first application server, a service request to obtain service from a second application that includes a remote interface and is running on the second application server, the service request including a client context and a signed ticket obtained by the first application from a system computer, wherein the signed ticket is based on the client context and a key associated with a system; validating, by the remote access engine, the received signed ticket based on the key associated with the system, wherein a validated signed ticket from the first application indicates that the first application is authorized to receive service from the second application; determining, by the remote access engine, in response to the signed ticket being validated, that the first application has authorization to obtain the requested service via the remote interface of the second application based on a comparison of an attribute of the received client context to an access control list associated with the second application; and sending a service reply from the second application to the first application to provide the requested service to the first application in response to determining that the first application has authorization to obtain the requested service via the remote interface of the second application.

In another general aspect, an apparatus includes receiving logic configured to receive, by a remote access engine running on the second application server from a first application running on a first application server, a service request to obtain service from a second application that includes a remote interface and is running on the second application server, the service request including a client context and a signed ticket obtained by the first application from a system computer, wherein the signed ticket is based on the client context and a key associated with a system; validation logic configured to validate, by the remote access engine, the received signed ticket based on the key associated with the system, wherein a validated signed ticket from the first application indicates that the first application is authorized to receive service from the second application; determining logic configured to determine, by the remote access engine, in response to the signed ticket being validated, that the first application has authorization to obtain the requested service via the remote interface of the second application based on a comparison of an attribute of the received client context to an access control list associated with the second application; and sending logic configured to send a service reply from the second application to the first application to provide the requested service to the first application in response to determining that the first application has authorization to obtain the requested service via the remote interface of the second application.

The subject matter described in this specification can be implemented as a method or as a system or using computer program products, tangibly embodied in information carriers, such as a CD-ROM, a DVD-ROM, a semiconductor memory, and a hard disk. Such computer program products may cause a data processing apparatus to conduct one or more operations described herein.

In addition, the subject matter described herein may also be implemented as a system including a processor and a memory coupled to the processor. The memory may encode one or more programs that cause the processor to perform one or more of the method acts described in this specification.

The details of one or more implementations are set forth in the accompanying drawings and the description below. Other features will be apparent from the description and drawings, and from the claims.

DETAILED DESCRIPTION

In the following, a detailed description of examples will be given with reference to the drawings. It should be understood that various modifications to the examples may be made. In particular, elements of one example may be combined and used in other examples to form new examples.

Figure 1:
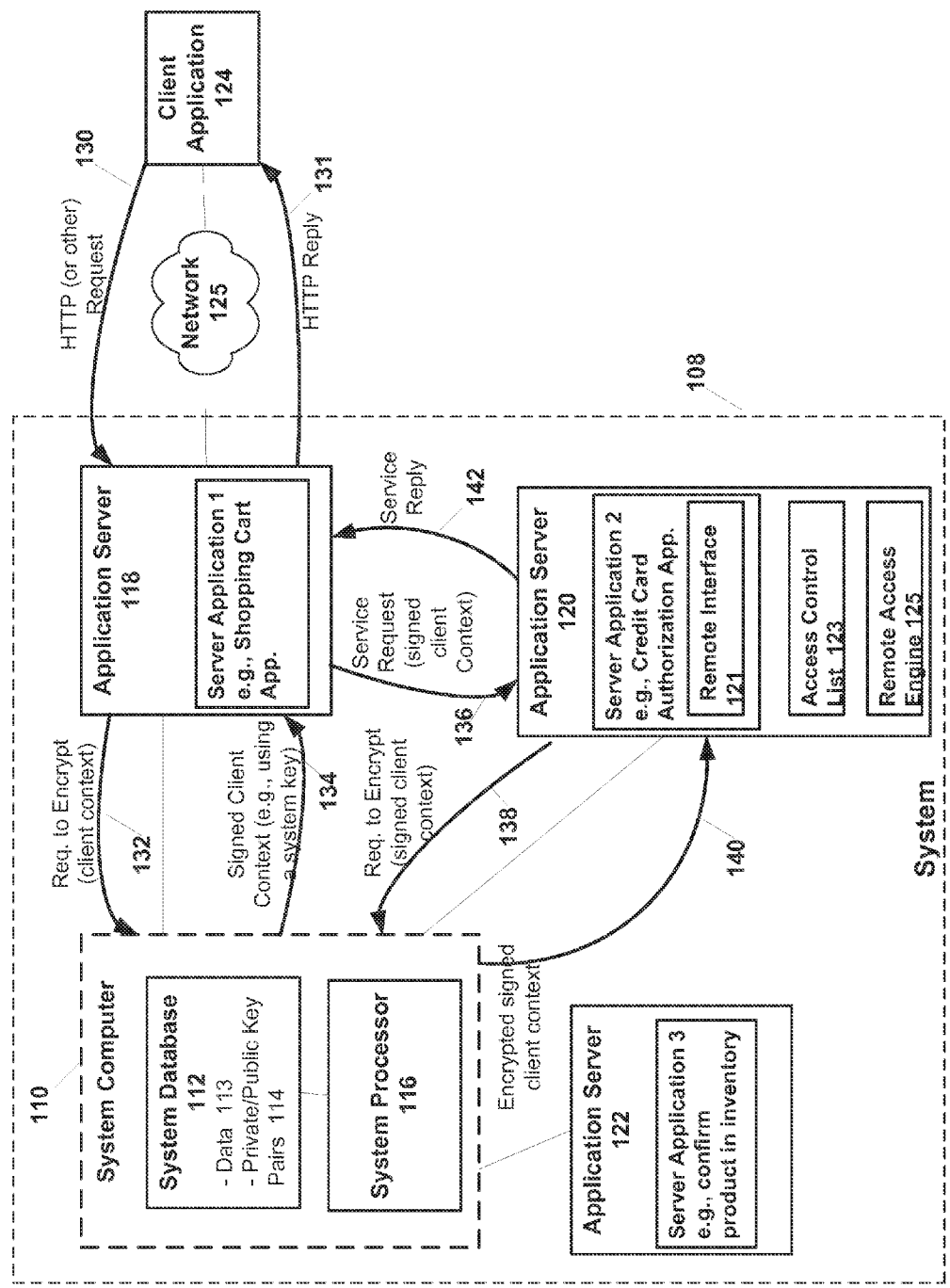
FIG. 1 is a block diagram illustrating a system 108 according to an example implementation.

FIG. 1 is a block diagram illustrating a system 108 according to an example implementation. In the example implementation shown in FIG. 1, system 108 may include a system computer 110, which may include a system processor 116 for processing information and a system database 112 for securely storing information, such as one or more keys, e.g., one or more private/public key pairs associated with or assigned to system 108. System database 112 may be a central system database, where the system 108 (and one or system, for example) may include only one central system database 112 to store, e.g., keys associated with the system. System 108 may also include one or more application servers, such as, for example, application servers 118, 120, 122, etc. In an example implementation, each application server may run on a different computing device, such as a different computer, server, etc., where each computing device may include a processor for processing instructions, a disk drive or other storage, memory, and may include input/output devices, for example. Application servers 118, 120 and 122 and system computer 110 of system 108 may be coupled to each other via an Intranet or Local Area Network (not shown), and may share one or more keys or key pairs stored securely in system database 112. While only three application servers are shown in FIG. 1, any number of application servers may be provided within system 108. Any applications may be run at the same time on the same or on different application servers.

A client application 124, which may be a Web browser or other application, may send a request (e.g., a HTTP Get request, a HTTP Post request, or other request) via network 125 (e.g., the Internet) to an application, such as to server application 1 running on application server 118. In order to process or fulfill the request from client application 124, server application 1 may obtain service(s) from one or more other applications within system 108 (and possibly from applications located in other systems). For example, server application 2 may provide an administrative service or other service (e.g., credit card authorization service) that should be accessible only to approved or authorized applications. According to an example embodiment, a requesting application may be granted access to obtain a requested service based on 1) a signed ticket validation, and 2) comparison of one or more client context attributes to an access control list associated with a requested application or service. For example, the signed ticket may be, e.g., a document or context information that has been signed or encrypted by system computer 110 using a system key or key associated with the system 108.

Each application server may include one or more server applications running thereon, with each server application providing one or more services. For example, server application 1 (which may be, e.g., a shopping cart application) may reside or run on application server 118. Server application 2 (which may be, e.g., a credit card authorization application or other administrative application) may reside or run on application server 120. And, server application 3 may reside or run on application server 122. These are merely some example servers and server applications, and the disclosure is not limited thereto. Many other applications may be provided. Each application may provide one or more services, e.g., as shopping cart service, a credit card authorization service, etc. These are merely some examples, and many other services may be provided.

According to an example embodiment, one or more of the server applications may include (or may expose) a remote interface through which other applications may obtain application services (e.g., credit card authorization). According to an example implementation, a remote interface may be an interface provided to allow non-local (e.g., located on a different server, or located in a different system) applications or clients (e.g., non-local application instances) to obtain services or invoke the methods of an application via the application's remote interface. The remote interface may include the definition one or more methods or services which may be remotely accessed by other applications. For example, server application 2 may include remote interface 121, which may include one or more methods (or services) and associated parameters. A result may also be defined for each method or service, to allow a service result for the method to be returned to the requesting application/client.

Server application 2 may also include an access control list 123 associated with server application 2, which may be used to determine which requesting clients or applications should be provided access to the methods or services of server application 2 via the remote interface 121. Thus, the access control list 123 may be specific to or associated with server application 2, and may identify one or more client applications that may access each of one or more services or methods provided by server application 2.

Access control list 123 may include, for example, a white list or approved list that may identify one or more entities (e.g., clients or applications) that are authorized to access the methods or services of server application 2. Access control list 123 may alternatively include a black list or denied list which may identify one or more applications, clients or other entities that are not allowed to access (or have access denied to) the methods or services of server application 2. The white list or black list of access control list 123 may identify applications, clients or other entities based on, for example one or more attributes of a client context which may include a system identifier (ID) that identifies a system of a requesting application (application that has requested access to the methods or services of application 2), a user ID that identifies a user of the requesting application, a client ID or application ID that identifies the requesting application (or identifies an instance of the requesting application), an application server ID that identifies the server on which the requesting application is running, a transaction ID associated with a transaction for the requesting application, a software package ID that identifies the software package of the requesting application.

According to an example implementation, as described in greater detail below, a requesting application (e.g., server application 1) may obtain requested services from a requested application (e.g., server application 2) via a remote interface 121 if the requesting application: 1) provides a signed ticket that is validated (e.g., to confirm integrity of a client context and/or to establish that the requesting application is a trusted party); and 2) it is determined that the first application has authorization to obtain the requested service based on a comparison of one or more attributes of a client context (presented by the requesting application) to an access control list 123.

Each application server may include a remote access engine to perform tasks related to remote access of one or more applications on the application server. For example, application server 120 may include a remote access engine 125 to perform remote access tasks for one or more applications running on application server 120. Each application on application server 120 may include a remote access and an access control list. Remote access engine 125 may control remote access to applications running on application server 120 or services offered from application server 120, such as by: 1) validating signed tickets received from requesting applications, and 2) comparing one or more client context attributes or fields received from a requesting application to an access control list 125 in order to determine that a requesting application may obtain the requested services from the requested application.

A client application 124 may communicate with one or more application servers 118, 120 and 122, and/or one or more applications running on each of the one or more application servers 118, 120, 122, etc. According to an example implementation, only some of the services provided by the applications may be accessible in general, e.g., to all programs or users, such as a shopping cart service or program. Some of the services and/or server applications may be accessible only to a select set of programs or users. For example, in a first example implementation, some applications or services may be accessible only to other applications or application servers within the same system. Or, in a second example implementation, some applications or services may be accessible only to applications or application servers within a subset of approved systems. Thus, access to some of the applications or services may be restricted. Thus, according to example embodiments, access to a remote interface or a remote application or service may be permitted for at least one or more applications within a same system as the requested application (e.g., requesting application and requested application reside on different application servers within the same system) or may be permitted for at least some applications of one or more approved outside systems (e.g., where requesting application and requested application are provided on application servers in different systems).

For example, administrative services, or other internal services such as a credit card authorization service, product inventory check service, etc., may be accessible only to a select group of one or more applications or users. In some cases, some applications may provide their services only to other server applications within the same system. While in other example implementations, some applications may provide services only to applications within a select group of systems. According to an example implementation, access to such restricted services may be provided through the use of a signed ticket that may be provided by the system computer 110, as described in greater detail below.

According to an example embodiment, an access control list may be used to control access to an application. For example, an access control list may identify one or more approved programs or users that may access the service or program. For example, an access control list or white (or approved) list may identify a set of users or programs, e.g., based on Internet Protocol (IP) address, that have been approved or authorized to access an application or service. Other types of access control lists may be used, such as a black list or a list of applications that are denied access to the application or services.

However, according to an example implementation, access to services or programs or applications may be controlled or restricted through the use and validation of a signed ticket based on a system-specific key (or a key associated with or assigned to a system, such as system 110). A key, e.g., a system private key or other key associated with system 108, may be securely stored in system database 112. For example, one or more private/public key pairs may be associated with (or assigned to) the system 108 and stored in database 112. Due to the secure storage of keys (e.g., which may be stored in database 112 in an encrypted form) only processor 116 may access and have the ability to decrypt and use the one or more system private keys stored in database 112. For example, there may be one private/public key pair, or many key pairs assigned to or associated with a system 108. In one example implementation, system database 112 may securely store a key pair associated with or assigned to each application server 118, 120, and 122, for example, within a system. For example, system computer 110 may sign a ticket with a requesting application's private key (or with the private key associated with an application server where the requesting application resides), or with the private key associated with an application server where a target or requested service resides or is located (where the requesting service may indicate the target or requested service and requested application server to the system computer 110 as part of a request for signed ticket, for example).

According to an example embodiment, a requesting application (e.g., server application 1) running (or installed and executed) on a first application server 118 within a system 108 may obtain a signed ticket from a system computer 110 of system 108. The requesting application (e.g., server application 1) may then present or provide such signed ticket to application server 120 to obtain or access a requested service, such as to access a credit card authorization service provided by server application 2 running on application server 120. Remote access engine 125 may receive the signed ticket and perform ticket validation, as described in greater detail herein.

In one example implementation, a signed ticket that has been signed by a system computer may indicate that the requesting application that presents such signed ticket is authorized to use any services or applications within the system. Or alternatively, the signed ticket may be used to access only some services or applications within a system 108, for example. For example, if a requesting application requests a signed ticket to access a specific service or a service on a specific application server, then the system computer may generate and return the signed ticket using a key associated with the requested application or associated with the application server on which the requested application resides, if the requesting application has permission to access such requested service or application. Thus, a signed ticket may provide general authorization for all services or applications within a system or group of systems, or alternatively may only authorize permission for the requesting service to only access specific services or to access services or applications only on specific application servers, for example.

For example, remote access engine 125 on the application server 120 (same server on which the server application 2 that provides the requested service is running) Remote access engine 125 may validate the received signed ticket, e.g., via communication with system computer 110 and/or with assistance of system computer 110. According to an example implementation, if the received signed ticket is validated, this may indicate that the requesting service is authorized or permitted to access the requested service. Alternatively, validation of a signed ticket may be used to confirm the integrity of the provided client context, while use of an access control list may provide a final operation that is performed before allowing the requesting application to obtain requested services from a requested application. On the other hand, if the received signed ticket does not validate (or is not validated by the requested service based on communication with the system computer 110), then the requested service is denied and the requested service and/or the application server on which the requested service resides may send a rejection message to the requesting application (e.g., server application 1) indicating that the request for service was denied or rejected.

In some cases, the requesting application (e.g., server application 1) may be referred to as a "client," and the requested application (e.g., server application 2) that may receive the request for service and may fulfill the request for service (if the signed ticket is validated and access to the requested service is authorized based on the access control list 123) may be referred to as a "server," e.g., as applications having a client-server relationship, even though both may be applications residing on servers.

Thus, a requesting application may determine and/or may generate a client context that may be provided to system computer 110 in order to obtain a signed ticket from system computer 110. A client context may provide information related to a client (or requesting) application (e.g., server application 1), for example. In an example implementation, the client context may include one or more fields, which may be provided to system computer 110 in one or more packet headers (e.g., HTTP header(s) or other header(s) of a service request). The client context may include, for example: a system identifier (or system ID) that identifies the system, a transaction ID, a software package from which the requesting application or from which the request is initiated, an application server ID that identifies the server on which the requesting application is running, a user ID that identifies the first application, and/or an address associated with the first application server or the first application. System ID may include an alpha-numeric value that may identify the system 108, e.g., HRD (e.g., identifying the system for the Human Resources Department of a company), or PRD (e.g., identifying the system for Product Research and Development department of a company). These are merely some examples, and any system IDs may be used.

Some examples will now be described with reference to FIG. 1. A request from client application 124 may be received via network 125 by server application 1. For example, client application (e.g., Web browser) may submit an HTTP request, e.g., HTTP Post to provide information (product identification and credit card information) as part of an order submitted to server application 1 (which may be a shopping cart application). The server application 1 (e.g., which may be a shopping cart application) may need to check product inventory to confirm the requested items are in stock (e.g., performed by server application 3) and to run a credit card authorization (e.g., performed by server application 2).

Server application 1 may obtain a signed ticket from system computer 110, e.g., for each service that is to be requested by the requesting application (server application 1). For example, server application 1 may determine or generate a client context for this service request. Server application 1 may then send a request to encrypt (or a request for a signed ticket) along with a client context via line 132 to system computer 110. Server application 1 may use a security related API to access security services provided by system computer 110, e.g., to request signing or encryption of a value (e.g., client context) provided. Server application 1 may provide a request including a user ID or application ID that is known by system computer 110 as identifying a valid application or user within system 108. Other information may be provided as well to computer 110, such as identification of the target (or requested) service/application or identification of the application service on which the target/requested service resides.

According to one example implementation, system computer 110 (including processor 116) may generate and return a signed ticket to the server application 1 via line 134. According to one example implementation, the signed ticket may include (or may be) the signed or encrypted client context, where the client context may be signed or encrypted using a key that is assigned to or associated with the system 108, for example.

The requesting application (e.g., server application 1) may then send a service request via line 136 to the application server 120 on which the requested application (server application 2) provides the requested service, such as a credit card authorization service. The service request may include the client context and the signed ticket (e.g., signed client context). The service request, including the client context and the signed client context is received by the remote access engine 125.

Rather than server application or the requesting application generating a client context and then communicating with system computer 110 to obtain a signed ticket, a remote access engine (not shown) provided on application server 118 may generate a client context on behalf of server application 1, and then communicate with system computer 110 on behalf of server application 1 to obtain a signed ticket from system computer 110, and then submit the request for service from server application 2 with the client context and signed ticket to remote access engine 125. Thus, for example, the remote access engine on application server 118 may generate a client context (e.g., based on the request for service being made by server application 1) and then send this client context via line 132 and may receive a signed ticket or signed client context via line 134. The remote access engine on the application server 118 may then provide this signed ticket, along with the client context and a service request to the remote access engine 125, in order to request, on behalf of service application 1, service from server application 2.

Alternatively, server application 1 may include a remote access engine on application server 118 that may generate a client context and then obtain a signed client context or signed ticket from system computer 110, and then submit a request to the remote access engine 125 requesting service from server application 2, where the request may include the client context and this signed ticket.

Remote access engine 125 may send a request to system computer 110 via line 138. The request sent via line 138 may include the received signed ticket and/or the received client context. In one example implementation, remote access engine 125 may send a request to decrypt to system computer 110 via line 138 that includes the signed ticket, and computer 110 may decrypt the signed ticket using a system key (such as a public key of a key pair, or other key), and return the decrypted signed ticket (which may typically be the recreated client context) to server application 2 via line 140. Or in another example implementation, remote access engine 125 may send to computer 110 via line 138 a request to encrypt the received client context, and the system computer 110 may encrypt such received client context using a system key associated with system 108 (e.g., system computer 110 may typically use a private key here that is the same private key used by computer 110 to generate the signed ticket provided to server application 1 via line 134). In this manner, a second signed ticket may be generated by system computer and provided back to remote access engine 125, where the second signed ticket may match a first signed ticket that was provided via line 140 to server application 1 (or a requesting application). The first signed ticket will match the second signed ticket, in the event the same key is used to encrypt the same received client context. Alternatively, system computer 110 may decrypt and return via line 140 to server application 2 a received signed client ticket.

Remote access engine 125 may then compare the signed ticket (or signed client context) received from server application 1 via line 136 to the signed ticket (or signed client context) received via line 140 from system computer 110. A match between these two signed tickets indicates that the received signed ticket received from the requesting application (e.g., server application 1) is validated, which means, e.g., that the requesting application (e.g., server application 1) is authorized or permitted by the system computer 110 to access the services of the requested service (e.g., server application 2). Remote access engine 125 then permits the requesting application to obtain the requested service from server application 2 (the requested application). Also, in one example implementation, a validated signed ticket may operate to ensure integrity of the client context, e.g., that the client context was sent from a trusted party and was not tampered with, for example.

Alternatively, if the decrypted signed client context is provided via line 140, remote access engine 125 may complete validation by comparing the received client context received from server application 1 to the decrypted signed client context received from system computer 110, and where a match indicates validation.

If the signed ticket has been validated, then remote access engine 125 may perform access control for the requesting application (server application 1) to determine if the requesting application may obtain requested service(s) from the requested application. For example, remote access engine 125 may determine whether the requesting application has authorization to obtain services or access the methods of the requested application (server application 2) via the remote interface 121 based on a comparison of one or more attributes of the received client context to the access control list 123 associated with the requested application.

For example, while there may be many applications within an authorized system that may be able to obtain a signed ticket to access an application, it may be desirable to limit or restrict access to such application or service to only some of such applications. Thus, a client context attribute, which may indicate information related to the requesting application, may be compared by remote access engine 125 to an access control list 123 to determine whether the requested services should be provided (e.g., via the remote interface 121).

After the signed ticket has been validated, remote access engine 125 has performed access control and determined that the requesting application is authorized to obtain services or access methods of the requested service based on, then the requested service may be provided by the requested application (e.g., server application 2). In this example, server application 2 may perform the credit card authorization, and assuming the credit card charge is approved or authorized, a reply is sent via line 142 to server application 1 indicating credit card approval. Server application 1 may then return an order confirmation to the client application via HTTP reply via line 131 to client application 124.

However, the access or usage of server applications 2 and 3 is transparent to client application 124, since client application 124 only communicated with or accessed services of server application 1 in this example. Also, any attempt by client application 124 to access services of server application 2 or server application 3 would have been rejected, since client application 124 would not have provided nor obtained the required signed ticket from system computer (and thus validation would have failed).

Also, in other example embodiments, it may not be necessary for both ticket validation and access control be performed before providing the requested service. For example, the requested service may be provided if either 1) signed ticket is validated, or the access control based on the client context attribute indicates that the requesting application is authorized to access the requested services.

Figure 2:
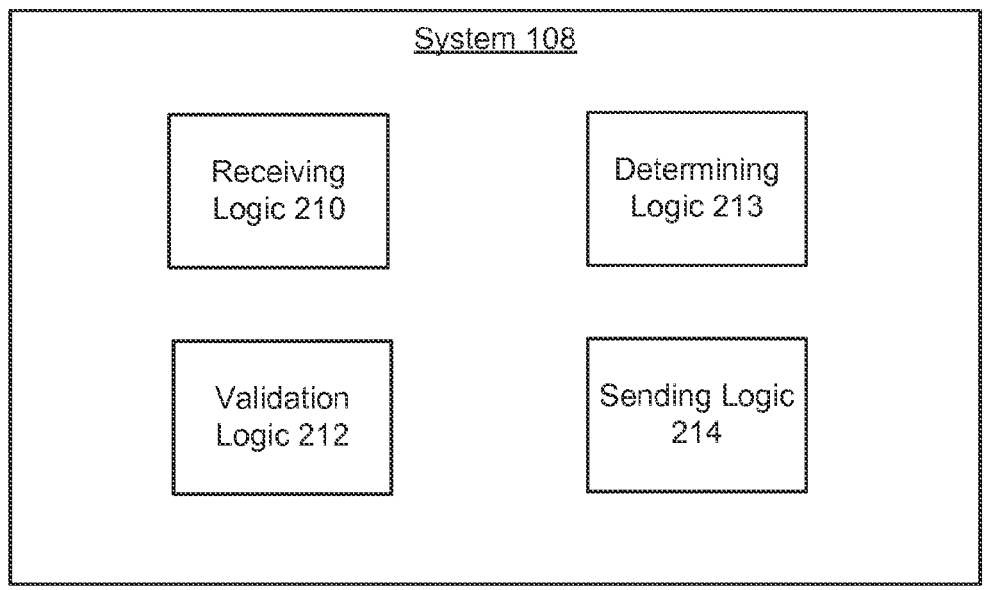
FIG. 2 is a block diagram illustrating a system according to an example implementation.

FIG. 2 is a block diagram of a system according to an example implementation. System 108 may include receiving logic 210 configured to receive, by a second application that includes a remote interface and is running on a second application server, a service request received from a first application running on a first application server, the service request including a client context and a signed ticket obtained by the first application from a system computer, wherein the signed ticket is based on the client context and a key associated with a system. System 108 may also include validation logic 212 configured to validate, by the second application, the received signed ticket based on the key associated with the system, wherein a validated signed ticket from the first application indicates that the first application is authorized to receive service from the second application. System 108 further includes determining logic 213 configured to determine, in response to the signed ticket being validated, that the first application has authorization to obtain the requested service via the remote interface of the second application based on a comparison of an attribute of the received client context to an access control list associated with the second application. System 108 may also include sending logic 214 configured to send a service reply from the second application to the first application to provide the requested service to the first application in response to the determining that the first application has authorization to obtain the requested service via the remote interface of the second application.

Figure 3:
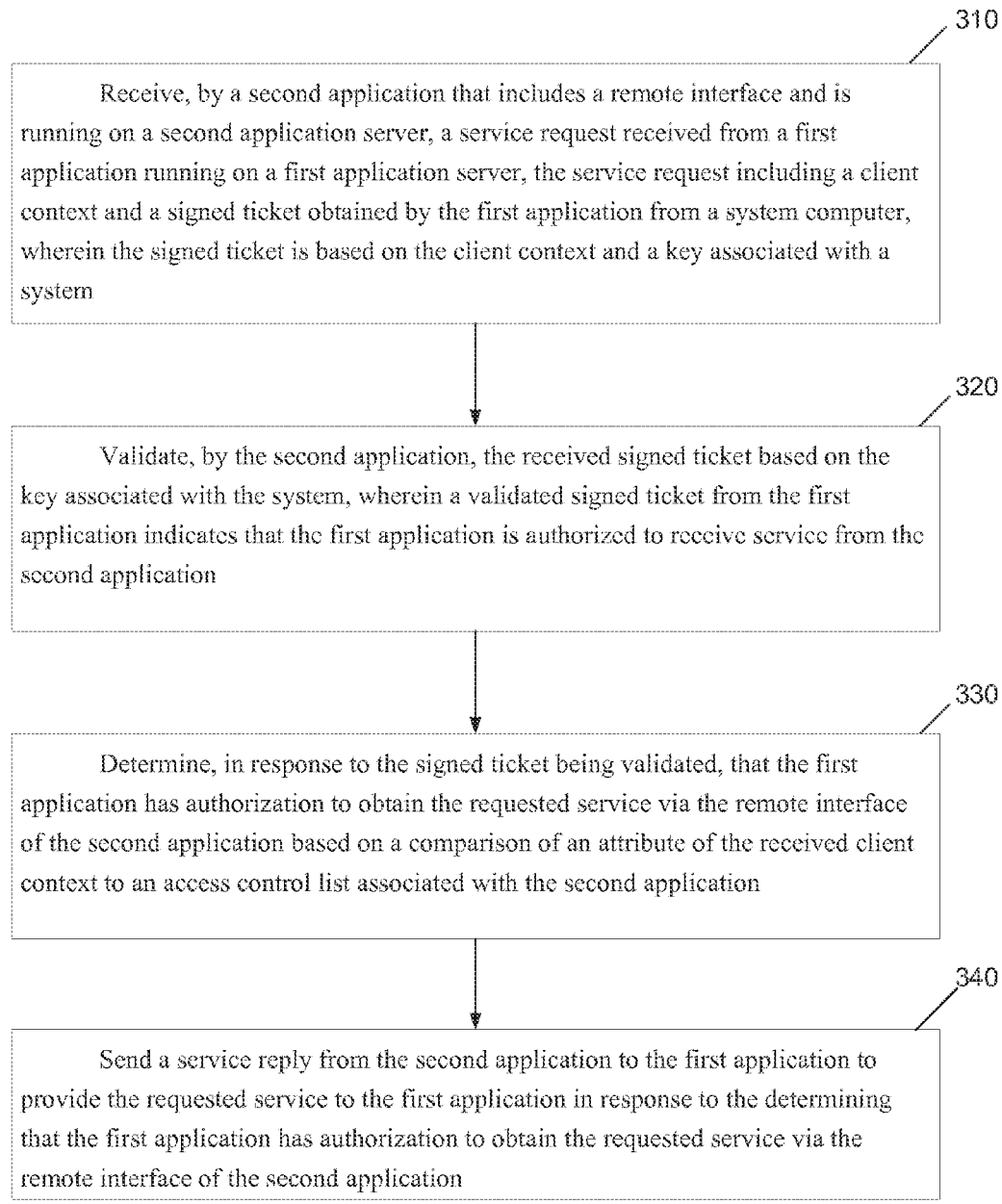
FIG. 3 is a flow chart illustrating operation of an application or application server according to an example implementation.

FIG. 3 is a flow chart illustrating operation of a server application or server application according to an example implementation. The client implemented method may include several operations, including operations 310, 320, 330 and 340.

Operation 310 may include receiving, by a remote access engine running on the second application server from a first application running on a first application server, a service request to obtain service from a second application that includes a remote interface and is running on the second application server, the service request including a client context and a signed ticket obtained by the first application from a system computer, wherein the signed ticket is based on the client context and a key associated with a system.

Operation 320 may include validating, by the remote access engine, the received signed ticket based on the key associated with the system, wherein a validated signed ticket from the first application indicates that the first application is authorized to receive service from the second application. application.

Operation 330 may include determining, by the remote access engine, in response to the signed ticket being validated, that the first application has authorization to obtain the requested service via the remote interface of the second application based on a comparison of an attribute of the received client context to an access control list associated with the second application.

Operation 340 may include sending a service reply from the second application to the first application to provide the requested service to the first application in response to determining that the first application has authorization to obtain the requested service via the remote interface of the second application.

According to another example implementation, a computer program product is provided that is tangibly embodied on a computer-readable storage medium and including executable code that, when executed, is configured to cause at least one data processing apparatus to: to receive, by a remote access engine running on the second application server from a first application running on a first application server, a service request to obtain service from a second application that includes a remote interface and is running on the second application server, the service request including a client context and a signed ticket obtained by the first application from a system computer, wherein the signed ticket is based on the client context and a key associated with a system; validate, by the remote access engine, the received signed ticket based on the key associated with the system, wherein a validated signed ticket from the first application indicates that the first application is authorized to receive service from the second application; determine, by the remote access engine, in response to the signed ticket being validated, that the first application has authorization to obtain the requested service via the remote interface of the second application based on a comparison of an attribute of the received client context to an access control list associated with the second application; and send a service reply from the second application to the first application to provide the requested service to the first application in response to determining that the first application has authorization to obtain the requested service via the remote interface of the second application.

In an example implementation, a system includes the system computer, the first application server and the first application, and the second application server and the second application. In another example implementation, the executable code further causes the first application to obtain the signed ticket the from the system computer based on the following: send the client context from the first application to the system computer; and receive, by the first application, a signed ticket from the system computer that is based on the client context and the key associated with the system.

According to another example implementation, the signed ticket received by the remote access engine from the first application may include a first signed ticket, and wherein the executable code causing the data processing apparatus to validate may include executable code causing the data processing apparatus to: send, from the remote access engine, the client context to the system computer; receive, by the remote access engine, a second signed ticket from the system computer that is based on the key associated with the system and the client context; and validate, by the remote access engine, the first signed ticket received from the first application by comparing the first signed ticket received from the first application to the second signed ticket received from the system computer, wherein a match between the first and second signed tickets indicates that the first signed ticket is validated.

According to another example implementation, the executable code causing the data processing apparatus to send comprises executable code causing the data processing apparatus to send, from the remote access engine, the client context to the system computer with a request to sign or encrypt the client context. And the executable code causing the data processing apparatus to receive comprises executable code causing the data processing apparatus to receive, by the remote access engine, the second signed ticket from the system computer, the second signed ticket including the client context that has been signed or encrypted by the system computer using the key associated with the system.

According to another example implementation, the system may include a processor, and a database to store the key associated with the system. The signed ticket includes a signed client context that was signed by the system computer using the key associated with the system.

In an example implementation, the client context may include at least a system identifier (ID) that identifies the system, a user ID that identifies the system, and an address associated with the first application server or the first application.

In another example implementation, the service request received by the remote access engine from the first application is sent by the first application to the second application to fulfill a client request received by the first application from a client application, and, the service(s) of the second application are accessible through the first application after validation and not directly accessible to the client application.

According to another example implementation, the system computer may include a first system computer, wherein a first system includes the first system computer, the first application server, and the first application, and wherein a second system includes the second application server, the second application, and a second system computer, and wherein the key includes a system private key that is stored by both the first system computer and the second system computer. The executable code causing the data processing apparatus to receive may include executable code causing the data processing apparatus to receive, by the remote access engine, a service request from the first application, the service request including a client context and a signed ticket obtained by the first application from the first system computer, the signed ticket being based on the client context and the system private key.

In an example implementation, the signed ticket received from the first application may include a first signed ticket, wherein the executable code causing the data processing apparatus to validate may include executable code causing the data processing apparatus to: send, from the remote access engine, the received client context to the second system computer, receive, by the remote access engine, a second signed ticket from the second system computer that is based on the system key and the client context, and validate, by the remote access engine, the first signed ticket received from the first application by comparing the first signed ticket received from the first application to the second signed ticket received from the second system computer, wherein a match between the first and second signed tickets indicates that the first signed ticket is validated.

An example implementation that involves multi-system validation will now be briefly described. According to an example implementation, some services may be provided only to other applications that belong to a selected group (or sub-set) of systems. For example, there may be three systems, including system A, system B and system C. Each system may include a system computer, and one or more application servers, with a remote access engine and one or more applications provided on each application server. System computers for each system may store their own system key(s) used to request and authorize services to be performed for other services within the same system, as described above for FIG. 1.

In addition, a system computer associated with system A may receive a copy of one or more system keys associated with system B, and a system computer associated with system B may receive and store system keys associated with system A. Thus, in this example, system keys may be exchanged between system computers of systems A and B, to allow services to be authorized between system A and system B services. That is, this key exchanged between systems A and B may allow a service from a system A application to be performed for a system B application, and to allow a service from a system B application to be performed for a system A application.

System C in this example does not share its system keys with other systems nor receive any keys from other systems, and therefore, system C does not (and applications of system C do not) support or authorize cross-system service requests.

For example, with respect to systems A and B, a requesting application of system A may submit a client context and request to encrypt to the system computer of system A, and may indicate that the request is for a signed ticket to access a system B service. The system computer of system A (which, based on keys exchanged between systems A and B) has a copy of one or more system keys associated with system B) may generate a system B signed ticket by encrypting or signing the received client context using the key associated with system B, and provide the signed ticket back to the requesting system A application.

The requesting system A application may then provide the client context and the system B signed ticket to a requested service (or to the remote access engine of system B) within system B. The remote access engine of system B may then, for example, submit the received client context to the system computer of system B, and may receive back a signed client context or signed ticket that was signed with the system B key. The requested service within system B may then compare the system B signed ticket received from the requesting system A application to the signed ticket from the system computer of system B. If these match (meaning the same client context was signed/encrypted with the same system B private key), this indicates that the signed system B ticket is validated and the requested service within system B provides the requested service to the requesting application within system A. After validation of the signed ticket is performed, the remote engine may perform access control by comparing a client context attribute(s) from the requesting application to an access control list associated with the requested application or server, for example.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program that might implement the techniques mentioned above might be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and including executable code that, when executed, is configured to cause at least one data processing apparatus to:
   receive, by a first application server from a client application, a client request;
   receive, by the first application server, a plurality of client contexts generated by a remote access engine and on behalf of the first application server, the plurality of client contexts including a client context for each of a plurality of application service requests identified in the client request, each of the client contexts based on at least a user ID or application ID and an identification of an associated requested application service;
   obtain, by the first application server from a system computer based on a key associated with a system, a first signed ticket based on a first client context and associated with a first application service, and a second signed ticket based on a second client context and associated with a second application service;
   send, by the first application server in response to the received client request, a first service request to a second application server the first service request including the first client context and the first signed ticket;
   receive, by the first application server, the requested service from the second application server;
   the second application server validates the first signed ticket by performing the following:
      send the first client context to the system computer;
      receive a third signed ticket from the system computer; and
      validate the first signed ticket received from the first application server by comparing the first signed ticket to the third signed ticket received from the system computer, wherein a match between the first and third signed tickets indicates that the first signed ticket is validated.

2. The computer program product of claim 1 wherein the code is further configured to cause the at least one data processing apparatus to:
   send a reply from the first application server to the client application based on the requested services received by the first application server from the second application server.

3. The computer program product of claim 1 wherein the second application server validates the received client context via communication with the system computer prior to providing the requested application service to the first application server.

4. The computer program product of claim 1 wherein the first application server obtaining a plurality of signed tickets, sending a plurality of service requests and receiving, by the first application server, the requested services is transparent to the client application.

5. The computer program product of claim 1 wherein each of the service requests includes a request to sign or encrypt the associated client context, the first signed ticket including the first client context that has been signed or encrypted by the system computer, and the second signed ticket including the second client context that has been signed or encrypted by the system computer.

6. The computer program product of claim 1 wherein a system includes the system computer including a central system database, the first application server, and the second application server.

7. The computer program product of claim 1 wherein a system includes the system computer that stores the key associated with the system, the system also including the first application server and the second application server, and wherein the executable code further causes the remote access engine running on the first application server to obtain the first signed ticket from the system computer based on the following:
   send the first client context to the system computer; and
   receive, by the remote access engine running on the first application server, the first signed ticket from the system computer that is based on the client context and the key associated with the system.

8. The computer program product of claim 1 wherein the system computer comprises:
   a processor; and
   a central database for the system to securely store the key associated with the system;
   wherein the first signed ticket includes a signed first client context that was signed by the system computer using the key associated with the system.

9. The computer program product of claim 1 wherein the client context comprises at least a system identifier (ID) that identifies the system.

10. The computer program product of claim 1 wherein the first client context comprises at least a system identifier (ID) that identifies the system, and an address associated with the first application server.

11. The computer program product of claim 1 wherein the first service request and the second service request are sent by the first application server to fulfill the client request received by the first application server from the client application, the requested services being accessible by the first application server after context validation by the second application server, the requested services are not directly accessible to the client application.

12. An apparatus comprising at least one processor and at least
   one memory including computer instructions, when executed by the at least one
   processor, cause the apparatus to:
   receive, by a first application server from a client application, a client request;
   receive, by the first application server, a plurality of client contexts generated by a remote access engine and on behalf of the first application server, the plurality of client contexts including a client context for each of a plurality of application service requests identified in the client request, each of the client contexts based on at least a user ID or application ID and an identification of an associated requested application service;
   obtain, by the first application server from a system computer based on a key associated with a system, a first signed ticket based on a first client context and associated with a first application service, and a second signed ticket based on a second client context and associated with a second application service;
   send, by the first application server in response to the received client request, a first service request to a second application server sending a second service request to a third application server, the first service request including the first client context and the first signed ticket, the second service request including the second client context and the second signed ticket;
   receive, by the first application server, the requested services from the second application server and the third application server;

the second application server validates the first signed ticket by performing the following:
send the first client context to the system computer;
receive a third signed ticket from the system computer; and
validate the first signed ticket received from the first application server by comparing the first signed ticket to the third signed ticket received from the system computer, wherein a match between the first and third signed tickets indicates that the first signed ticket is validated.

13. The apparatus of claim 12 wherein the system includes the system computer including a central system database, the first application server, the second application server and the third application server.

14. The apparatus of claim 12 wherein the system includes the system computer that stores the key associated with the system, the system also including the first application server, the second application server and the third application server, and wherein the executable code further causes the remote access engine running on the first application server to obtain the first signed ticket from the system computer based on the following:
send the first client context to the system computer; and
receive, by the remote access engine running on the first application server, the first signed ticket from the system computer that is based on the client context and the key associated with the system.

15. The computer program product of claim 1 wherein the code is further configured to cause the at least one data processing apparatus to:
send a second service request to a third application server, the second service request including the second client context and the second signed ticket;
receive, by the first application server, the requested service from the third application server.

16. The computer program product of claim 15 wherein:
the third application server validates the second signed ticket by performing the following:
send the second client context to the system computer;
receive a third signed ticket from the system computer;
validate the second signed ticket received from the first application server by comparing the second signed ticket to the third signed ticket received from the system computer, wherein a match between the second and third signed tickets indicates that the second signed ticket is validated.

17. A computer implemented method comprising:
receiving, by a first application server from a client application, a client request;
generate a plurality of client contexts including a client context for each of a plurality of application service requests identified in the client request, each of the client contexts based on at least a user ID or application ID and an identification of an associated requested application service;
obtaining, by the first application server from a system computer based on a key associated with a system, a first signed ticket based on a first client context and associated with a first application service, and a second signed ticket based on a second client context and associated with a second application service;
sending, by the first application server in response to the received client request, a first service request to a second application server and sending a second service request to a third application server, the first service request including the first client context and the first signed ticket, the second service request including the second client context and the second signed ticket; and
receiving, by the first application server, the requested services from the second application server and the third application server;
the third application server validates the second signed ticket by performing the following:
send the second client context to the system computer;
receive a third signed ticket from the system computer; and
validate the second signed ticket received from the first application server by comparing the second signed ticket to the third signed ticket received from the system computer, wherein a match between the second and third signed tickets indicates that the second signed ticket is validated.

18. The method of claim 17 wherein:
the second application server validates the first signed ticket by performing the following:
send the first client context to the system computer;
receive a third signed ticket from the system computer;
validate the first signed ticket received from the first application server by comparing the first signed ticket to the third signed ticket received from the system computer, wherein a match between the first and third signed tickets indicates that the first signed ticket is validated.

19. The method of claim 17 and further comprising sending a reply from the first application server to the client application based on the requested services received by the first application server from the second application server and the third application server.

20. The method of claim 17 wherein each of the second and third application servers validate their respective received client contexts via communication with the system computer prior to providing the requested application service to the first application server.

* * * * *